United States Patent
An et al.

(10) Patent No.: US 10,031,272 B2
(45) Date of Patent: Jul. 24, 2018

(54) DISPLAY DEVICE WITH BACKLIGHT USING DICHROIC FILTER TO PREVENT LIGHT LEAKAGE

(71) Applicant: Samsung Display Co., Ltd., Yongin-si, Gyeonggi-Do (KR)

(72) Inventors: Jae Sul An, Hwaseong-si (KR); Donghoon Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 260 days.

(21) Appl. No.: 14/747,468

(22) Filed: Jun. 23, 2015

(65) Prior Publication Data

US 2016/0103267 A1  Apr. 14, 2016

(30) Foreign Application Priority Data

Oct. 14, 2014  (KR) .................. 10-2014-0138453

(51) Int. Cl.
| | | |
|---|---|---|
| G09F 13/04 | (2006.01) | |
| G09F 13/08 | (2006.01) | |
| G09F 13/10 | (2006.01) | |
| F21V 7/04 | (2006.01) | |
| F21V 8/00 | (2006.01) | |

(52) U.S. Cl.
CPC .......... *G02B 6/0023* (2013.01); *G02B 6/005* (2013.01); *G02B 6/0026* (2013.01)

(58) Field of Classification Search
CPC .... G02B 6/0023; G02B 6/005; G02B 6/0026; G02B 6/0018; G02B 6/0031; G02B 5/20; G02B 5/26; G02B 5/265; G02F 1/133609; G02F 1/133615; G02F 1/133517; G02F 1/133624; G02F 2001/133624; G02F 1/133614
USPC ............................. 362/97.1–97.4, 624, 627
See application file for complete search history.

(56) References Cited

U.S. PATENT DOCUMENTS

| | | | | |
|---|---|---|---|---|
| 8,622,600 | B2 * | 1/2014 | Cheng ................ | G02B 6/0023 362/608 |
| 2002/0109805 | A1 * | 8/2002 | Baba ................. | G02F 1/133615 349/65 |
| 2008/0089096 | A1 * | 4/2008 | Lin ...................... | G02B 6/0055 362/622 |
| 2010/0271807 | A1 * | 10/2010 | Chiu ................. | G02F 1/133609 362/97.1 |
| 2011/0141769 | A1 * | 6/2011 | Lee ..................... | G02B 6/0023 362/629 |
| 2012/0113671 | A1 | 5/2012 | Sadasivan et al. | |
| 2013/0050612 | A1 | 2/2013 | Hur et al. | |
| 2013/0148376 | A1 | 6/2013 | Nick et al. | |
| 2013/0335677 | A1 * | 12/2013 | You ................... | G02F 1/133609 349/65 |
| 2013/0336003 | A1 * | 12/2013 | Yang ................. | G02B 6/42 362/608 |

(Continued)

FOREIGN PATENT DOCUMENTS

KR  10-2013-0082170 A  7/2013

*Primary Examiner* — Erin Kryukova
(74) *Attorney, Agent, or Firm* — H.C. Park & Associates, PLC

(57) ABSTRACT

A display apparatus includes a display panel and a backlight unit. The backlight unit includes a light source emitting a first color light, a light guide member, quantum dots, and a dichroic filter preventing the first color light from being leaked.

20 Claims, 6 Drawing Sheets

(56) References Cited

U.S. PATENT DOCUMENTS

| | | | | |
|---|---|---|---|---|
| 2014/0036538 A1* | 2/2014 | You | ................... | G09F 13/0409 |
| | | | | 362/613 |
| 2014/0153280 A1* | 6/2014 | Lee | ..................... | G02B 5/23 |
| | | | | 362/606 |
| 2014/0319995 A1* | 10/2014 | Kim | ................ | G02F 1/133512 |
| | | | | 313/501 |
| 2014/0332830 A1* | 11/2014 | Fan | ..................... | G02B 6/005 |
| | | | | 257/89 |
| 2015/0103291 A1* | 4/2015 | Li | ..................... | G02B 6/0023 |
| | | | | 349/62 |
| 2015/0124195 A1* | 5/2015 | Chen | ................ | G02F 1/133512 |
| | | | | 349/61 |
| 2015/0131028 A1* | 5/2015 | Oh | ..................... | G02B 6/005 |
| | | | | 349/65 |
| 2015/0168634 A1* | 6/2015 | Lu | ..................... | G02B 6/0031 |
| | | | | 362/606 |
| 2015/0331170 A1* | 11/2015 | Cheng | ................ | G02B 6/0031 |
| | | | | 362/607 |
| 2015/0338064 A1* | 11/2015 | Ishino | ............... | G02F 1/133615 |
| | | | | 349/61 |
| 2015/0339996 A1* | 11/2015 | Schuck | ............ | G02F 1/133603 |
| | | | | 348/58 |
| 2015/0355399 A1* | 12/2015 | You | ..................... | G02B 6/005 |
| | | | | 349/65 |

\* cited by examiner

DISPLAY DEVICE WITH BACKLIGHT USING DICHROIC FILTER TO PREVENT LIGHT LEAKAGE

CLAIM OF PRIORITY

This U.S. non-provisional patent application claims the priority of and all the benefits accruing under 35 U.S.C. § 119 of Korean Patent Application No. 10-2014-0138453, filed on Oct. 14, 2014 in the Korean Intellectual Property Office ("KIPO"), the contents of which are hereby incorporated by reference in its entirety.

BACKGROUND OF THE INVENTION

1. Field of Disclosure

The present disclosure relates to a display apparatus. More particularly, the present disclosure relates to a display apparatus having improved display quality.

2. Description of the Related Art

A display apparatus is classified into a transmissive type display apparatus, a transflective type display apparatus, and a reflective type display apparatus. The transmissive and transflective type display apparatuses include a display panel to display an image using a light supplied from a backlight unit to the display panel.

The backlight unit includes a light source to generate the light and a light guide member to guide the light provided from the light source to the display panel. The light source includes a circuit board and light emitting blocks mounted on the circuit board. The light emitting blocks are disposed to face a light incident surface of the light guide member.

SUMMARY OF THE INVENTION

The present disclosure provides a display apparatus having improved display quality.

Embodiments of the inventive concept provide a display apparatus including a display panel displaying an image and a backlight unit disposed under the display panel to provide a display light to the display panel.

The backlight unit includes a light source, a light guide member, a quantum dot sheet, and a first dichroic filter.

The light source emits a first color light, and the first color light is a blue light.

The light guide member includes a light output surface, an opposite surface facing the light output surface, a light incident surface connecting the light output surface and the opposite surface and facing the light source, and a connection surface connecting the light output surface, the opposite surface, and the light incident surface; and guides the first color light incident through the light incident surface to the display panel.

The quantum dot sheet is disposed on the light guide member to convert the first color light emitted from the light output surface to the display light. The quantum dot sheet covers at least a portion of the light output surface.

The quantum dot sheet includes first quantum dots each having a size to absorb the first color light and emit a second color light and second quantum dots each having a size to absorb the first color light and emit a third color light.

The display light is a white light in which the first, second, and third color lights are mixed with each other. The first color light is the blue light, the second color light is a red light, and the third color light is a green light.

The first dichroic filter faces the connection surface to prevent the first color light incident to the light guide member from leaking to the outside of the light guide member through the connection surface. The first dichroic filter reflects the first color light and transmits the second and third color lights.

The display apparatus further includes a second dichroic filter facing the opposite surface of the light guide member and a third dichroic filter disposed at at least an edge of the quantum dot sheet.

Embodiments of the inventive concept provide a display apparatus including a display panel displaying an image and a backlight unit disposed under the display panel to provide a display light to the display panel. The backlight unit includes a light source, a light guide member, a quantum dot tube, and a first dichroic filter.

The light source emits a first color light, and the first color light is a blue light.

The light guide member includes a light output surface, an opposite surface facing the light output surface, a light incident surface connecting the light output surface and the opposite surface and facing the light source, and a connection surface connecting the light output surface, the opposite surface, and the light incident surface.

The quantum dot tube is disposed between the light source and the light guide member to convert the first color light to the display light.

The quantum dot tube includes a glass tube and a plurality of quantum dots.

The glass tube extends in one direction and has a closed ring shape when viewed from a cross-sectional view substantially perpendicular to the direction in which the glass tube extends.

The glass tube includes a first portion facing the light source, to which the first color light is incident, a second portion facing the light incident surface, from which the display light emits, a third portion connecting an upper portion of the first portion and an upper portion of the second portion, and a fourth portion connecting a lower portion of the first portion and a lower portion of the second portion.

The quantum dots are injected into the glass tube. Some of the quantum dots absorb the first color light to emit a second color light, and the others of the quantum dots absorb the first color light to emit a third color light. The first color light is the blue light, the second color light is a red light, and the third color light is a green light.

The first dichroic filter is disposed on the quantum dot tube to prevent the first color light from being leaked. The first dichroic filter may be disposed on an upper surface of the third portion.

The quantum dot tube further includes a second dichroic filter disposed on a lower surface of the fourth portion.

According to the above, the display apparatus prevents the blue light from leaking to the outside thereof, and thus display quality of the display apparatus may be improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
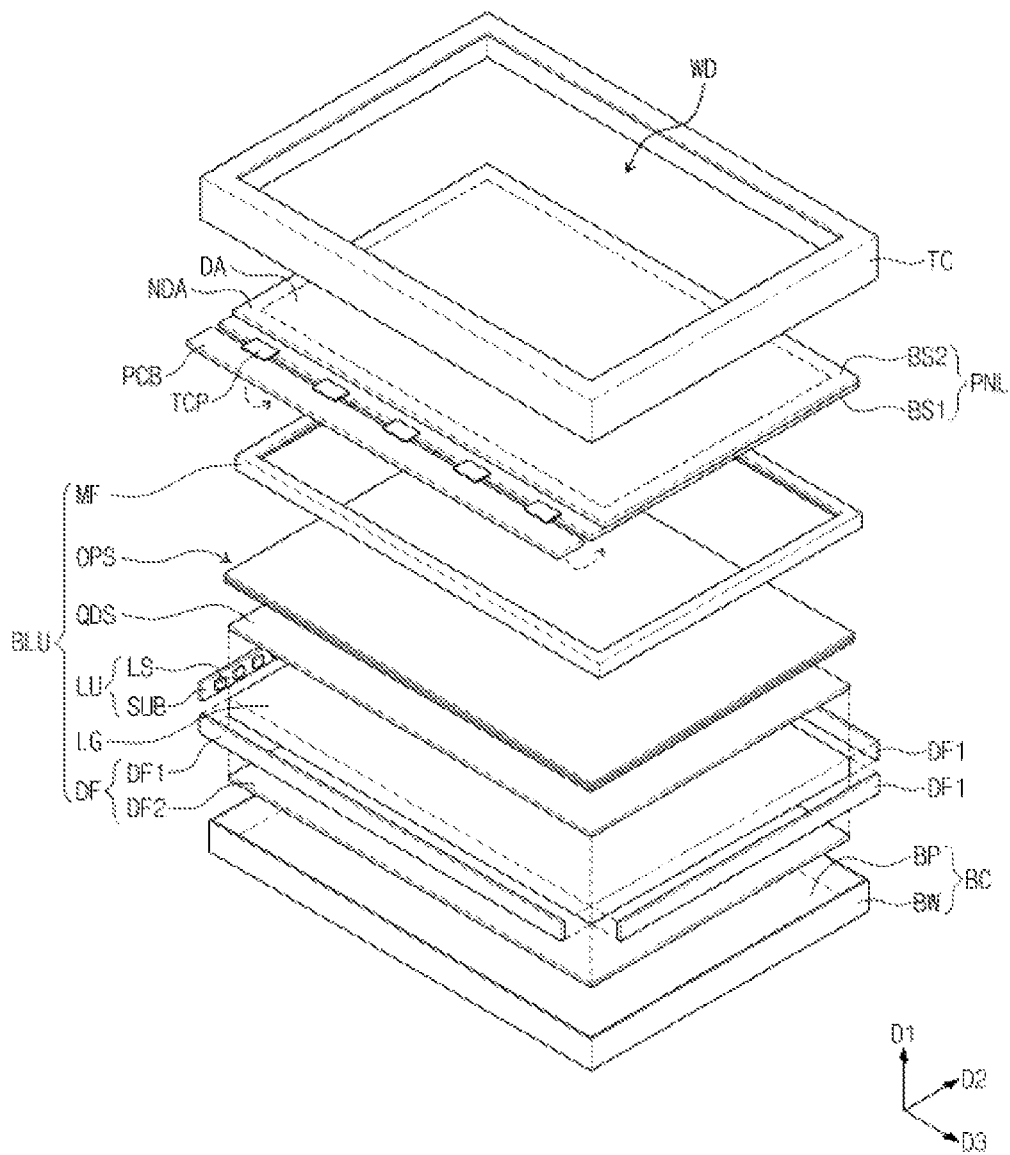
FIG. 1 is an exploded perspective view showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a display apparatus according to an exemplary embodiment of the present disclosure.

Referring to FIG. 1, the display apparatus includes a display panel PNL, a backlight unit BLU, a bottom cover BC, and a top chassis TC. Hereinafter, for the convenience of explanation, a direction in which an image is displayed in the display apparatus is referred to as an upper direction and a direction opposite to the upper direction is referred to as a lower direction, but they should not be limited thereto or thereby.

The display panel PNL displays the image in a first direction D1. The display panel PNL is not a self-emissive display panel. As the display panel PNL, various display panels, such as a liquid crystal display panel, an electrowetting display panel, an electrophoretic display panel, a microelectromechanical system display panel, etc., may be used. Hereinafter, the liquid crystal display panel will be described as the display panel PNL.

The display panel PNL has a substantially rectangular shape of a pair of short sides extending in a second direction D2 substantially perpendicular to the first direction D1 and a pair of long sides extending in a third direction D3 substantially perpendicular to the first and second directions D1 and D2.

The display panel PNL includes a first base substrate BS1, a second base substrate BS2 facing the first base substrate BS1, and a liquid crystal layer (not shown) interposed between the first and second base substrates BS1 and BS2. When viewed in a plan view, the display panel PNL includes a display area DA in which the image is displayed and a non-display area NDA surrounding the display area DA, in which the image is not displayed. The non-display area NDA is covered by the top chassis TC.

According to the present exemplary embodiment, the first base substrate BS1 includes a plurality of pixel electrodes (not shown) and a plurality of thin film transistors (not shown) electrically connected to the pixel electrodes in a one-to-one correspondence. Each thin film transistor is connected to the corresponding pixel electrode of the pixel electrodes to switch a driving signal applied to the corresponding pixel electrode.

The second base substrate BS2 includes a common electrode (not shown) that forms an electric field in cooperation with the pixel electrodes to control an alignment of liquid crystal molecules of the liquid crystal layer. The display panel PNL drives the liquid crystal molecules of the liquid crystal layer to display the image in the first direction D1.

The display panel PNL includes a driving chip (not shown) to generate the driving signal, a tape carrier package TCP on which the driving chip is mounted, and a printed circuit board PCB electrically connected to the display panel PNL through the tape carrier package TCP. In FIG. 1, the printed circuit board PCB is disposed on the same plane as the display panel PNL, but the position at which the printed circuit board PCB is disposed should not be limited thereto or thereby. For instance, the printed circuit board PCB may be disposed on an outer surface of the bottom cover BC (along a direction indicated by the curved arrow in FIG. 1). In this case, the tape carrier package TCP connected between the display panel PNL and the printed circuit board PCB is bent along an outer surface of the bottom cover BC. Meanwhile, the driving chip generates the driving signal to drive the display panel PNL in response to an external signal. The external signal is provided from the printed circuit board PCB and includes image signals, control signals, and driving voltages.

In the present exemplary embodiment, only one printed circuit board PCB is used, but the number of the printed circuit board PCB should not be limited to one. That is, plural printed circuit boards are applied to the display panel PNL and disposed at different positions from each other. In addition, the printed circuit board PCB may be directly mounted on the display panel PNL in the form of a driving integrated circuit chip.

Figure 2:
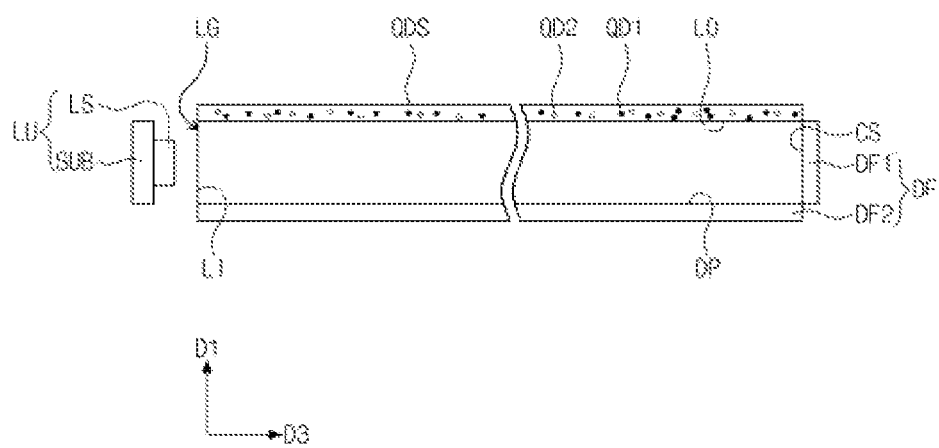
FIG. 2 is a cross-sectional view showing a portion of a display apparatus according to an exemplary embodiment of the present disclosure.

FIG. 2 is a cross-sectional view showing a portion of a display apparatus according to an exemplary embodiment of the present disclosure.

Referring to FIGS. 1 and 2, the backlight unit BLU is disposed under the display panel PNL to provide a light to the display panel PNL. The backlight unit BLU includes a light source unit LU, a light guide member LG, a quantum dot sheet QDS, a dichroic filter DF, at least one optical sheet OPS, and a mold frame MF.

The light source unit LU includes a light source LS and a substrate SUB on which the light source LS is mounted. In the present exemplary embodiment, the light source LS emits a blue light. However, the light source LS, if necessary, may emit a light having a wavelength different from that of the blue light. The light emitted from the light source LS is incident to the light guide member LG.

Various light sources, e.g., a point light source, a line light source, a surface light source, etc., may be used as the light source LS. In the present exemplary embodiment, the point light source, e.g., a light emitting diode (LED), will be described as the light source LS. In FIG. 1, a plurality of LEDs is disposed on the substrate SUB and arranged in the second direction D2, but it should not be limited thereto or thereby. For instance, one LED or plural LED groups may be used as the light source LS.

The substrate SUB may be, but not limited to, a circuit board on which wires used to apply a voltage source to the light source LS are printed. In the present exemplary embodiment, the substrate SUB has a substantially rectangular plate shape extending in the second direction D2.

The substrate SUB includes a light source controller (not shown) connected to the light source LS. The light source controller (not shown) analyzes the image displayed in the display panel PNL and outputs a local dimming signal to control brightness of the light source LS in response to the local dimming signal. The light source controller (not shown) may be mounted on a separate circuit board.

The light guide member LG is disposed under the display panel PNL and disposed adjacent to one side portion of the light source unit LU to guide the light incident thereto to the display panel PNL.

The light guide member LG includes a light incident surface LI, a light output surface LO, an opposite surface OP, and a connection surface CS. In the present exemplary embodiment, the light guide member LG has a rectangular parallelepiped plate shape.

The light output surface LO corresponds to one surface of two largest surfaces of the light guide member LG. The light output surface LO faces the display panel PNL. The light incident to the light guide member LG through the light incident surface LI emits through the light output surface LO and travels to the display panel PNL.

The opposite surface OP corresponds to the other surface of the two largest surfaces of the light guide member LG and faces the light output surface LO. The light incident to the light guide member LG travels through the light guide member LG while being reflected between the light output surface LO and the opposite surface OP and emits through the light output surface LO, and then the light travels to the display panel PNL.

The light incident surface LI is connected between the light output surface LO and the opposite surface OP and faces the light source unit LU. The light emitted from the light source unit LU is incident to the light guide member LG through the light incident surface LI. When the light source unit LU is disposed to face at least one side surface of the light guide member LG connecting the two largest surfaces of the light guide member LG, the at least one side surface serves as the light incident surface LI.

The connection surface CS is configured to include other side surfaces of the light guide member LG connecting the light output surface LO and the opposite surface OS except for the light incident surface LI. In this way, the connection surface CS connects the light output surface LO, the opposite surface OP, and the light incident surface LI.

The light guide member LG includes a transparent polymer resin, e.g., polycarbonate, polymethylmethacrylate, etc.

The quantum dot sheet QDS is disposed between the light guide member LG and the display panel PNL and converts the blue light emitted from the light output surface LO to a display light. The quantum dot sheet QDS covers at least a portion of the light output surface LO. The quantum dot sheet QDS may be fixed to the light output surface LO.

In the present exemplary embodiment, the quantum dot sheet QDS includes a plurality of quantum dots having different sizes to generate the display light.

The quantum dot includes a core, a shell surrounding the core, and a ligand attached to the shell. The quantum dot absorbs and excites a light having a wavelength with an energy above a band gap of the quantum dot to emit a light having a specific wavelength due to a quantum confinement effect. Here, the band gap has a specific value according to the size of the quantum dot and has spectral characteristics in which a full-width-half-maximum (FWHM) is narrow.

Due to the sizes of the quantum dots, the lights having rainbow colors including red, green, and blue colors may be easily generated. In addition, a white color and various colors may be realized by using the quantum dots having various sizes.

The quantum dot sheet QDS according to the present exemplary embodiment includes first quantum dots QD1 and second quantum dots QD2, each of the first quantum dots QD1 have a size appropriate to absorb a portion of the blue light emitted from the light source LS and emit the red light, and each of the second quantum dots QD2 have a size appropriate to absorb a portion of the blue light emitted from the light source LS and emit the green light.

As a result, the red and green lights generated by the first and second quantum dots QD1 and QD2 are mixed with the blue light not absorbed by the first and second quantum dots QD1 and QD2, and thus the white light is generated. The white light generated by the light passing through the quantum dot sheet QDS is provided to the display panel PNL after passing through the optical sheet OPS.

The dichroic filter DF is disposed to face at least one surface of the light guide member LG. The dichroic filter DF is an inorganic material filter and serves as a light filter to selectively transmit the light according to a wavelength of the light. The dichroic filter DF according to the present exemplary embodiment transmits the red and green lights, but blocks the blue light.

The dichroic filter DF reflects the blue light, and thus the blue light incident to the light guide member LG may be prevented from being leaked to the outside of the light guide member LG through the portion of the light guide member LG except for the light output surface LO.

In the present exemplary embodiment, the dichroic filter DF has been described to block the blue light since the blue light is emitted from the light source LS, but it should not be limited thereto or thereby. That is, when the kind of the light emitted from the light source LS is changed, the kind of the dichroic filter DF may be changed.

The dichroic filter DF includes a first dichroic filter DF1 facing the connection surface CS and a second dichroic filter DF2 facing the opposite surface OP.

The first dichroic filter DF1 is attached to at least a portion of the connection surface CS to prevent the blue light incident to the light guide member LG from being leaked to the outside of the light guide member LG through the connection surface CS. The first dichroic filter DF1 may be coated on the connection surface CS, but it should not be limited thereto or thereby. Although the first dichroic filter DF1 is provided more than one-piece as shown in FIG. 1, the first dichroic filter DF1 may be formed as one-piece extended in a direction. The second dichroic filter DF2 covers at least a portion of the opposite surface OP. The second dichroic filter DF2 prevents the blue light incident to the light guide member LG from being leaked to the outside of the light guide member LG through the opposite surface OP. The second dichroic filter DF2 may be coated on or attached to the opposite surface OP.

Referring to FIG. 1 again, the optical sheet OPS is disposed between the quantum dot sheet QDS and the display panel PNL. The optical sheet OPS controls the light emitted from the light source LS. The optical sheet OPS includes a diffusion sheet, a prism sheet, and a protective sheet, which are sequentially stacked on the quantum dot sheet QDS.

The diffusion sheet diffuses the light and the prism sheet collects the light diffused by the diffusion sheet in a direction substantially perpendicular to a plane surface of the display panel PNL. The light passing through the prism sheet is vertically incident to the display panel PNL. The protective sheet is disposed on the prism sheet. The protective sheet protects the prism sheet from external impacts. In the present exemplary embodiment, the optical sheet OPS includes one diffusion sheet, one prism sheet, and one protective sheet, but they should not be limited thereto or thereby. That is, at least one of the diffusion sheet, the prism sheet, and the protective sheet of the optical sheet OPS may be provided in a plural number, and one or more sheets of the optical sheet OPS may be omitted if necessary. In addition, the stacked order of the diffusion sheet, the prism sheet, and the protective sheet should not be limited to the above-mentioned order.

The backlight unit BLU may further includes a reflective member (not shown) to reflect the light to the display panel PNL.

The mold frame MF is disposed under the display panel PNL to support the display panel PNL. The mold frame MF supports the optical sheet OPS.

The mold frame MF may include a fixing member, e.g., a catching jaw, to fix or support the display panel PNL, the light source unit LU, and the optical sheets OPS. The mold frame MF is provided to correspond to four sides of the display panel PNL or at least a portion of the four sides. For instance, the mold frame MF has a rectangular closed ring shape to correspond to the four sides of the display panel PNL or an open ring shape, such as a U shape to correspond to three sides of the display panel PNL. The mold frame MF may be integrally formed as a single unitary and individual unit or formed in plural parts, which are assembled to each other, if necessary. The mold frame MF includes an organic material, e.g., a polymer resin, but it should not be limited thereto or thereby.

The bottom cover BC is disposed under the backlight unit BLU. The bottom cover BC includes a bottom portion and a sidewall portion BW bent from an upper portion of the bottom portion BP. The backlight unit BLU is accommodated in a space defined by the bottom portion BP and the sidewall portion BW.

The top chassis TC is disposed on the display panel PNL. The top chassis TC supports an edge of a front surface of the display panel PNL and covers a side surface of the mold frame MF or the sidewall portion BW of the bottom cover BC. The top chassis TC is provided with a display window WD formed therethrough to expose the display area DA of the display panel PNL.

Figure 6:
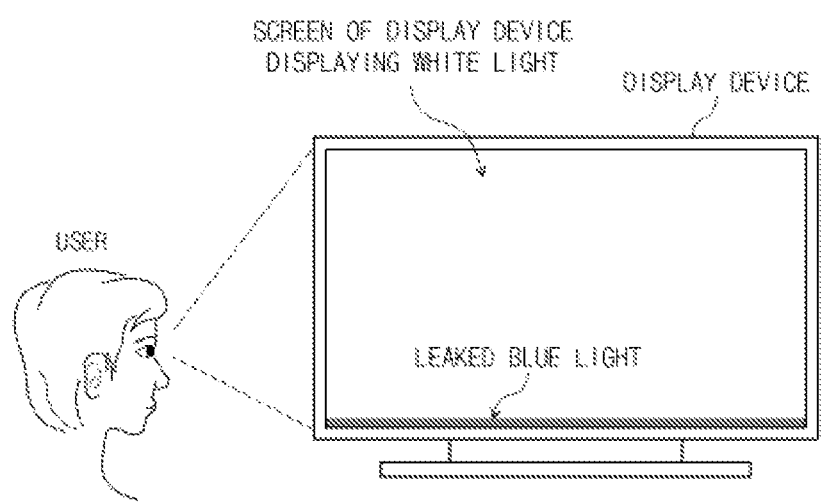
FIG. 6 is a conventional display device having a problem of leakage of blue light from a light source of a backlight unit.

In a conventional light source emitting the blue light, the blue light incident to the light guide member leaks to the outside of the light guide member through the portion of the light guide member rather than the light output surface, and thus a light leakage phenomenon, in which the blue light is perceived through the display panel by a user, occurs (FIG. 6). Although FIG. 6 shows leaked blue light occurred at one edge portion of a display device, the leaked blue light may be further occurred at other edge portions of the display device.

However, the display apparatus according to the present exemplary embodiment includes the dichroic filter DF disposed at at least the portion of the light guide member LG, and thus the blue light is prevented from being leaked to the outside of the light guide member LG through the portion of the light guide member LG rather than the light output surface LO. Accordingly, the display apparatus according to the present exemplary embodiment may display the image with superior quality.

Hereinafter, a portion of a display apparatus according to another exemplary embodiment will be described in detail.

Figure 3:
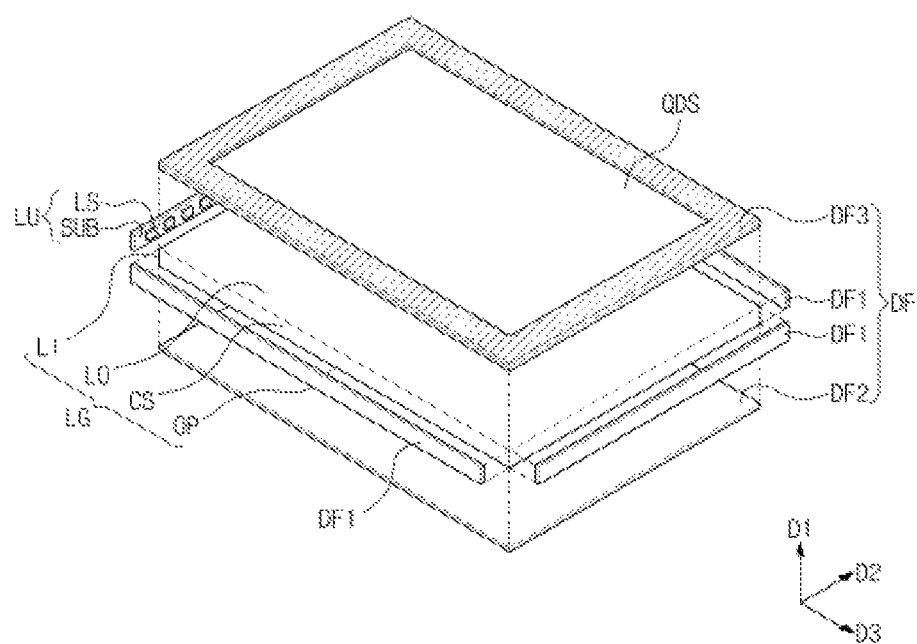
FIG. 3 is an exploded perspective view showing a display apparatus according to another exemplary embodiment of the present disclosure.

FIG. 3 is an exploded perspective view showing a display apparatus according to another exemplary embodiment of the present disclosure. In FIG. 3, the same reference numerals denote the same elements in FIGS. 1 and 2, and thus detailed descriptions of the same elements will be omitted.

Referring to FIG. 3, the display apparatus includes a light source unit LU, a light guide member LG, a quantum dot sheet QDS, and a dichroic filter DF.

The dichroic filter DF includes a first dichroic filter DF1 facing the connection surface CS of the light guide member LG, a second dichroic filter DF2 facing the opposite surface OP of the light guide member LG, and a third dichroic filter DF3 disposed on the quantum dot sheet QDS.

The first dichroic filter DF1 is attached to or coated on the connection surface CS and prevents the light incident to the light guide member LG from leaking to the outside of the light guide member LG through the connection surface CS. Although not shown in the drawing, the first dichroic filter DF1 extends in the first direction and covers at least one of side surfaces of quantum dot sheet QDS to prevent the light leakage from quantum dot sheet QDS.

The second dichroic filter DF2 is attached to or coated on the opposite surface OP and prevents the light incident to the light guide member LG from leaking to the outside of the light guide member LG through the opposite surface OP.

The third dichroic filter DF3 is disposed on the quantum dot sheet QDS along at least an edge of the quantum dot sheet QDS. The third dichroic filter DF3 is attached to or coated on the quantum dot sheet QDS.

As described above, since the display apparatus further includes the third dichroic filter DF3, the light emitting through the light output surface LO of the light guide member LG may be prevented from leaking to the outside without being incident to the quantum dot sheet QDS. Accordingly, the display apparatus may effectively prevent occurrence of the light leakage phenomenon of the blue light and improve color reproducibility thereof, thereby displaying the image with superior quality.

Figure 4:
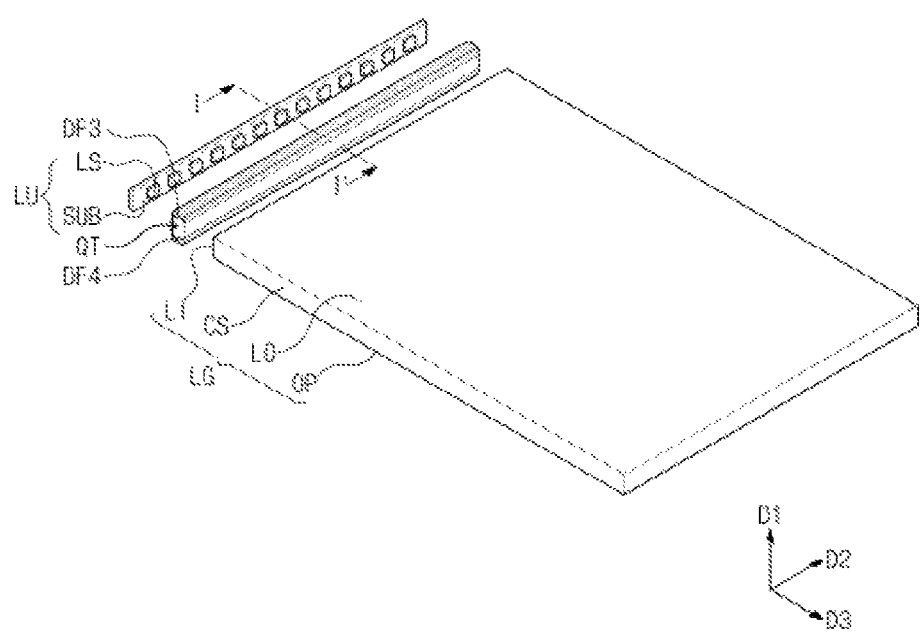
FIG. 4 is a perspective view showing a portion of a display apparatus according to another exemplary embodiment of the present disclosure.
Figure 5:
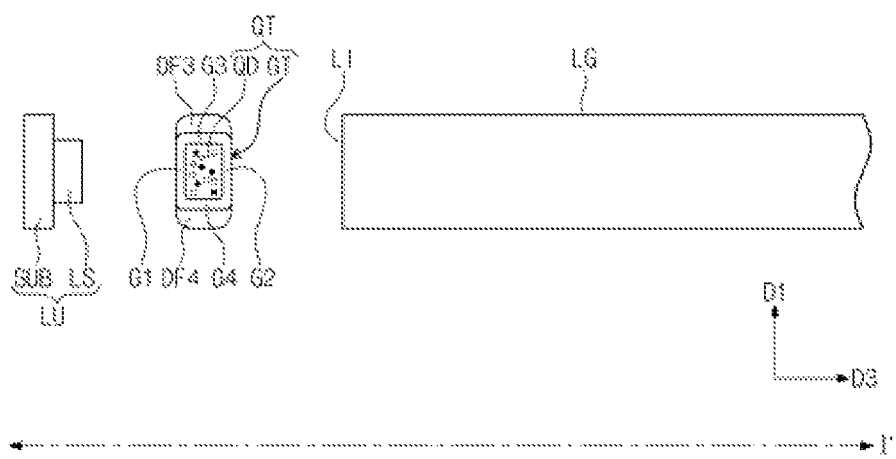
FIG. 5 is a cross-sectional view taken along a line I-I' shown in FIG. 5 to show the display apparatus.

FIG. 4 is a perspective view showing a portion of a display apparatus according to another exemplary embodiment of the present disclosure and FIG. 5 is a cross-sectional view taken along a line I-I' shown in FIG. 5 to show the display apparatus.

Referring to FIGS. 4 and 5, the display apparatus includes a light source unit LU, a light guide member LG, a quantum dot tube QT, and a dichroic filter DF.

The quantum dot tube QT is disposed between the light source unit LU and the light guide member LG. The quantum dot tube QT faces the light incident surface LI of the light guide member LG and extends in a second direction D2 along a direction in which the light source unit LU extends.

The quantum dot tube QT includes a glass tube GT and a plurality of quantum dots QD.

The glass tube GT extends in the second direction D2. The glass tube GT has a closed ring shape when viewed from a cross-sectional view substantially perpendicular to the second direction D2 in which the glass tube GT extends. FIG. 5 shows the glass tube GT having a rectangular closed ring shape, but the shape of the glass tube GT should not be limited to the rectangular closed ring shape. That is, the glass tube GT may have a polygonal or circular closed ring shape.

The glass tube GT includes a first portion G1 facing the light source unit LU, a second portion G2 facing the light incident surface LI, a third portion G3 connecting an upper portion of the first portion G1 and an upper portion of the second portion G2, and a fourth portion G4 connecting a lower portion of the first portion G1 and a lower portion of the second portion G2.

The first portion G1 is disposed adjacent to the light source unit LU, and thus the light emitted from the light source LS of the light source unit LU is incident to the first portion G1.

The second portion G2 faces the first portion G1. The light incident through the first portion G1 travels to the light guide member LG after emitting through the second portion G2.

The third and fourth portions G3 and G4 face each other and connect the first and second portions G1 and G2. Each of the third and fourth portions G3 and G4 has a curved surface at positions at which the third and fourth portions G3 and G4 are connected to the first and second portions G1 and G2, but they should not be limited thereto or thereby. Each of the third and fourth portions G3 and G4 may have various shapes as long as the third and fourth portions G3 and G4 connect the first and second portions G1 and G2.

The quantum dots QD are injected into a space formed and bounded by the first to fourth portions G1 to G4. The quantum dots QD absorb a portion of the blue light emitted from the light source LS and emit a light having a wavelength different from that of the blue light.

Some of the quantum dots QD absorb the blue light to emit a red light and the others of the quantum dots QD absorb the blue light to emit a green light. As a result, the display light emitted from the quantum dot tube QT may be the white light obtained by mixing the blue, red, and green lights with each other.

The dichroic filter DF includes a third dichroic filter DF3 disposed on the third portion G3 and a fourth dichroic filter DF4 disposed under the fourth portion G4.

The third dichroic filter DF3 prevents the light emitted from the light source LS from leaking to the upper side of the quantum dot tube QT without being incident to the quantum dots QD. The third dichroic filter DF3 is attached to or coated on at least a portion of the third portion G3.

The fourth dichroic filter DF4 prevents the light emitted from the light source LS from leaking to the lower side of the quantum dot tube QT without being incident to the quantum dots QD. The fourth dichroic filter DF4 is attached to or coated on at least a portion of the fourth portion G4.

In the present exemplary embodiment, the dichroic filter DF is disposed at the upper and lower sides of the quantum dot tube QT, but it should not be limited thereto or thereby. That is, the dichroic filter DF may be disposed at the upper or lower side of the quantum dot tube QT.

As described above, since the display apparatus includes the dichroic filter DF disposed at the upper and lower sides of the quantum dot tube QT, the light, which does not transmit through the quantum dots QD, may be prevented from being perceived through the display panel. Therefore, the display quality of the image displayed in the display panel may be improved.

Although the exemplary embodiments of the present invention have been described, it is understood that the present invention should not be limited to these exemplary embodiments but various changes and modifications can be made by one ordinary skilled in the art within the teaching and scope of the present invention as hereinafter claimed.

What is claimed is:

1. A display apparatus comprising:
   a display panel; and
   a backlight unit disposed under the display panel to provide a display light to the display panel,
   the backlight unit comprising:
   a light source emitting a first color light;
   a light guide member comprising a light output surface, an opposite surface facing the light output surface, a light incident surface connecting the light output surface and the opposite surface and facing the light source, and a connection surface connecting the light output surface, the opposite surface, and the light incident surface to guide the first color light incident through the light incident surface to the display panel;
   a quantum dot sheet disposed on the light guide member to convert the first color light emitting from the light output surface to the display light; and
   a dichroic filter facing a portion of the light guide member to reflect the first color light and transmit other colors of light except for the first color light to prevent the first color light incident to the light guide member from being leaked from the portion of the light guide member, wherein the dichroic filter comprises a first dichroic filter facing the connection surface.

2. The display apparatus of claim 1, wherein the quantum dot sheet comprises:
first quantum dots each having a size to absorb the first color light and emit a second color light; and
second quantum dots each having a size to absorb the first color light and emit a third color light.

3. The display apparatus of claim 2, wherein the display light is a white light in which the first, second, and third color lights are mixed with each other.

4. The display apparatus of claim 2, wherein the first color light is a blue light, the second color light is a red light, and the third color light is a green light.

5. The display apparatus of claim 2, wherein the first dichroic filter reflects the first color light and transmits the second and third color lights.

6. The display apparatus of claim 1, wherein the dichroic filter further comprises a second dichroic filter facing the opposite surface.

7. The display apparatus of claim 1, wherein the dichroic filter further comprises a third dichroic filter disposed at at least an edge of the quantum dot sheet.

8. The display apparatus of claim 1, wherein the quantum dot sheet covers at least a portion of the light output surface.

9. The display apparatus of claim 6, wherein the second dichroic filter reflects the first color light and transmits the second and the third color lights.

10. The display apparatus of claim 7, wherein the third dichroic filter reflects the first color light and transmits the second and the third color lights.

11. The display apparatus of claim 1, wherein the dichroic filter further comprises a second dichroic filter facing the opposite surface and a third dichroic filter disposed at at least an edge of the quantum dot sheet, the first color light being blue, the second color light being red and the third color light being green, and
wherein each of the first, second and third dichroic filters reflect blue light and transmit red and green lights.

12. A display apparatus comprising:
a display panel; and
a backlight unit disposed under the display panel to provide a display light to the display panel,
the backlight unit comprising:
a light source emitting a first color light;
a light guide member comprising a light output surface, an opposite surface facing the light output surface, a light incident surface connecting the light output surface and the opposite surface and facing the light source, and a connection surface connecting the light output surface, the opposite surface, and the light incident surface;
a quantum dot tube disposed between the light source and the light guide member to convert the first color light to the display light; and
a dichroic filter disposed on a portion of the quantum dot tube to reflect the first color light and transmit other colors of light except for the first color light to prevent the first color light from being leaked from the portion of the quantum dot tube, wherein the dichroic filter comprises a first dichroic filter disposed on a upper side of the quantum dot tube.

13. The display apparatus of claim 12, wherein the quantum dot tube comprises:
a glass tube; and
a plurality of quantum dots injected into the glass tube, some of the quantum dots absorb the first color light to emit a second color light, and the others of the quantum dots absorb the first color light to emit a third color light.

14. The display apparatus of claim 13, wherein the first color light is a blue light, the second color light is a red light, and the third color light is a green light.

15. The display apparatus of claim 13, wherein the glass tube extends in one direction and has a ring shape when viewed from a cross-sectional view substantially perpendicular to the direction in which the glass tube extends.

16. The display apparatus of claim 15, wherein the glass tube comprises:
a first portion facing the light source, to which the first color light is incident;
a second portion facing the light incident surface, from which the display light emits;
a third portion connecting an upper portion of the first portion and an upper portion of the second portion; and
a fourth portion connecting a lower portion of the first portion and a lower portion of the second portion,
wherein the third portion is substantially the upper side of the quantum dot tube.

17. The display apparatus of claim 16, wherein the first dichroic filter is disposed on an upper surface of the third portion.

18. The display apparatus of claim 16, wherein the dichroic filter further comprises a second dichroic filter disposed on a lower surface of the fourth portion.

19. The display apparatus of claim 14, wherein the first dichroic filter reflects the blue light and transmits red and green lights.

20. The display apparatus of claim 18, wherein each of the first and second dichroic filters reflects blue light and transmits red and green lights.

* * * * *